(12) United States Patent
Iwamura

(10) Patent No.: US 8,340,353 B2
(45) Date of Patent: Dec. 25, 2012

(54) CLOSE-UP SHOT DETECTING APPARATUS AND METHOD, ELECTRONIC APPARATUS AND COMPUTER PROGRAM

(75) Inventor: Hiroshi Iwamura, Tokyo (JP)

(73) Assignee: Pioneer Corporation, Tokyo (JP)

( * ) Notice: Subject to any disclaimer, the term of this patent is extended or adjusted under 35 U.S.C. 154(b) by 477 days.

(21) Appl. No.: 12/595,748

(22) PCT Filed: Apr. 16, 2007

(86) PCT No.: PCT/JP2007/058260
§ 371 (c)(1),
(2), (4) Date: Oct. 13, 2009

(87) PCT Pub. No.: WO2008/129656
PCT Pub. Date: Oct. 30, 2008

(65) Prior Publication Data
US 2011/0164786 A1    Jul. 7, 2011

(51) Int. Cl.
*G06K 9/00* (2006.01)
(52) U.S. Cl. .......... 382/103; 382/118; 382/115
(58) Field of Classification Search .......... 382/103, 382/104, 291, 118
See application file for complete search history.

(56) References Cited

U.S. PATENT DOCUMENTS

| | | | | |
|---|---|---|---|---|
| 5,835,641 | A | * | 11/1998 | Sotoda et al. .......... 382/291 |
| 6,919,892 | B1 | * | 7/2005 | Cheiky et al. .......... 345/473 |
| 2010/0086050 | A1 | * | 4/2010 | Badawy .......... 375/240.16 |
| 2011/0026780 | A1 | * | 2/2011 | Corcoran et al. .......... 382/118 |

FOREIGN PATENT DOCUMENTS

| | | |
|---|---|---|
| JP | 2006-244074 | 9/2006 |
| JP | 2006-251885 | 9/2006 |
| JP | 2007-013478 | 1/2007 |

* cited by examiner

*Primary Examiner* — Claire X Wang
(74) *Attorney, Agent, or Firm* — Young & Thompson

(57) ABSTRACT

A close-up shot detection device includes motion detection element that calculates the amount of motion between at least two frames or fields constituting a video image every predetermined unit which is composed of one pixel or a plurality of adjacent pixels constituting the frame or field; binarization element that binarizes the calculated amount of motion; large-area specifying element that specifies, as a large area, a connected area in which the number of units is equal to or larger than a predetermined threshold, among connected areas which are obtained by connecting a predetermined number of units having the same binarized amount of motion; and close-up shot specifying element that, when at least one of preset criteria for the specified large area satisfies a predetermined condition, specifies a frame or field having the specified large area as a close-up shot. Consequently, a close-up shot can be easily and rapidly detected.

15 Claims, 8 Drawing Sheets

(a)

(b)

CLOSE-UP SHOT DETECTING APPARATUS AND METHOD, ELECTRONIC APPARATUS AND COMPUTER PROGRAM

TECHNICAL FIELD

The present invention relates to a close-up shot detecting apparatus and method, an electronic apparatus and a computer program for detecting close-up shot included in motion picture such as video.

BACKGROUND ART

In the detecting method of this type of apparatus, a shot or a shot scene where a part of or all of a moving object covers major area meaningly or un-fortuitously (hereinafter referred to as "close-up shot", as occasion demands) or a frame imagery corresponding to the shot (hereinafter referred to as "close-up frame" or "close-up shot frame", as occasion demands) is detected. The shot or the frame imagery is epitomized, for example, by a shot or a frame imagery where a face of a person is filmed in close-up in an image. For example, the following apparatus is suggested: the apparatus calculates a motion vector by using a plurality of frame imageries; then, the apparatus judges whether or not the whole calculated motion vector follows a predetermined camera work model; and then, the apparatus detects a frame imagery as a moving object close-up frame if it is judged that it does not follow (cf. a patent document 1).

Patent document 1: Japanese Patent Application Laid Open No. 2006-244074.

DISCLOSURE OF INVENTION

Subject to be Solved by the Invention

However, according to the aforementioned background art, since the apparatus judges whether or not it follows a camera work model, the apparatus must calculate a motion vector. Thus, there is a technical problem that it takes time to detect a close-up frame or a close-up shot. Additionally, there is a technical problem that a camera work model must be defined.

In view of the aforementioned problem, for example, it is therefore an object of the present invention to provide a close-up shot detecting apparatus and method, an electronic apparatus and computer program which can detect close-up shot easily and swiftly.

Means for Solving the Subject

The above object of the present invention can be achieved by a close-up shot detecting apparatus is provided with: a motion detecting device for calculating amount of motion between at least two frames or fields constituting an image for every predetermined units each of which is composed of one pixel or a plurality of adjacent pixels constituting the frames or the fields; a binarizing device for converting the calculated amount of motion into binary; a large area specifying device for specifying an area where number of the predetermined units is greater than or equal to a predetermined threshold as a large area from connected areas where the predetermined units of which the binarized amount of motion is identical are connected; and a close-up shot specifying device for specifying a frame or a field which has the specified large area as a close-up shot if at least one of a plurality of evaluation items preliminarily determined in regard to the specified large area meets a predetermined condition.

According to the close-up shot detecting apparatus of the present invention, in its operation, first, by the motion detecting device which is composed of such as a processor and a memory, amount of motion between at least two frames or fields constituting an image is calculated for every predetermined units. Here, the "predetermined unit" of the present invention may be one pixel constituting a frame imagery or a field imagery, or may be a block which is composed of a plurality of pixels (e.g. 16 pixels long by 16 pixels width).

The "at least two frames or fields" of the present invention constitute, for example, a motion picture (i.e. an image) filmed by such as a video camera. The "at least two frames or fields" of the present invention are at least two frame imageries or field imageries, which are arrayed in tandem, of a plurality of frame imageries or a plurality of field imageries which are filmed, obtained, inputted, generated or the like at regular or arbitrary intervals on a time axis. The "at least two frames or fields" are typically two frame imageries or field imageries which are arrayed sequentially without sandwiching other frame or field between the two frame imageries or field imageries on the time axis. But, the "at least two frames or fields" may be two frames or fields which are arrayed intermittently by sandwiching a few other frames or fields between the two frame imageries or field imageries on the time axis.

The "amount of motion" of the present invention means difference of positions between at least two frames or at least two fields arising from a movement of a moving object which appears in frames or fields or camera work such as PAN (panorama). This amount of motion may be obtained by using a block matching method in which a mobile vector to which difference of a predetermined block unit is minimized between a plurality of frames or fields of which sampling time is different from each other is obtained, an optical flow calculating device for obtaining a mobile vector by one pixel unit, or the like, for example.

Specifically, for example, when an image is filmed or the like by progressive, odd field which is composed of odd lines of a plurality of line (i.e. scanning line) constituting one frame of two frames is extracted, and even field which is composed of even lines of other frame is extracted. Next, a frame for an amount of motion calculating processing is generated by combining the extracted odd field of one frame and the extracted even field of other frame. Then, amount of motion is obtained from the generated frame for each a predetermined unit.

Alternatively, when an image is filmed or the like by interlaced, a frame for an amount of motion calculating processing is generated by combining odd field and even field. Then, amount of motion is obtained from the generated frame for each a predetermined unit.

Next, by the large area specifying device which is composed of such as a processor and a memory, an area where number of the predetermined units is greater than or equal to a predetermined threshold from connected areas where the predetermined units of which the binarized amount of motion is identical are connected is specified as a large area. Incidentally, detecting or specifying connected areas is performed by a labeling processing or the like, for example. Moreover, the "threshold for number of units" is a value which determines whether or not it is the large area. The threshold for number of units is typically set as a fixed value in advance, but may be set as a changeable value changing according to some parameter. Alternatively, a user defines a close-up shot, thereby the threshold for number of units is set manually. This threshold for number of units depends on the resolution of an image or the predetermined unit. For example, the threshold for number of units is 60 blocks if the resolution of an image is 480 pixels long by 720 pixels width and if the predetermined unit is the block with 16 pixels long by 16 pixels width. The threshold for number of units is set as a value which can estimate that a frame is considered for a close-up shot.

Next, by the close-up shot specifying device which is composed of such as a processor and a memory, a frame or a field which has the aforementioned specified large area is specified as a close-up shot if at least one of a plurality of evaluation items preliminarily determined in regard to the aforementioned specified large area meets a predetermined condition. On the other hand, if all of the plurality of evaluation items preliminarily determined in regard to the aforementioned specified large area do not meet the predetermined condition, the frame or the field which has the aforementioned specified large area is not specified as the close-up shot. Here the "evaluation item" is, for example, the shape of the large area, the position of the large area on a frame and the like. Moreover, the "predetermined condition" is a condition which determines whether or not a frame is the close-up shot. The predetermined condition is set as a condition which can certainly estimate a frame is the close-up shot.

In the present invention, it is specified whether or not a frame is a frame corresponding to a close-up shot by a frame unit or a field unit in accordance with result of the statistical processing using the binarizing without clearing up where a close-up shot is or what close-up shot exists in a frame or a field. Namely, in the present invention, a specialized processing for specifying whether or not a frame is a frame corresponding to a close-up shot by a frame unit or a field unit is performed. In other words, in the present invention, a complicate and sophisticated processing using a motion vector for clearing up where a close-up shot is or what close-up shot exists in a frame or a field, or a complicate and sophisticated processing such as pattern recognition or object recognition which specifies a person or a animal constituting a close-up shot need not be performed.

Specifically, for example, in the present invention, it only has to be able to judge whether or not an object moves greater than or equal to a predetermined speed in a frame or a field (i.e. whether or not the amount of motion calculated by the motion detecting device is greater than or equal to the predetermined threshold). In the present invention, it is not need to specify a moving direction of the object, an actual moving speed, distance and the like. Moreover, since only relatively large motion of an object in a frame or a field is detected or extracted by setting a threshold, amount of throughput is reduced drastically.

It is said that by eliminating generating additional or extra information on a process for achieving an objective for specifying whether or not it is a close-up shot by frame unit or by field unit, the present invention achieves this primary objective through a minimum of data processing or near offer. Therefore, it is possible to achieve the objective with amount of calculation which is much less than a motion vector searching device which is used in a MPEG (Moving Picture Expert Group) coding apparatus or the like, for example. Thus, it is possible to shorten the time for a series of process.

As a result, according to the close-up shot detecting apparatus of the present invention, it is possible to easily and swiftly detect a close-up shot.

In one aspect of the close-up shot detecting apparatus of the present invention, said large area specifying device is provided with: a connected area detecting device for detecting the connected areas; and a large area extracting device for extracting areas where the number of predetermined units is greater than or equal to the threshold for number of units as the large area.

According to this aspect, in the large area specifying device, first, by the connected area detecting device which is composed of such as a processor and a memory, predetermined units of which the binarized amount of motion is identical are extracted; an area where the extracted predetermined units are connected is detected. Then, by the large area extracting device which is composed of such as a processor and a memory, an area where the number of predetermined units is greater than or equal to the threshold for number of nits is extracted as the close-up shot. Thus, it is possible to specify the large area exceedingly effectively on the basis of the binarized amount of motion.

In another aspect of the close-up shot detecting apparatus of the present invention, said close-up shot specifying device is provided with: a judging device for judging the extracted large area is whether or not the at least one meets the predetermined condition; and a close-up shot detecting device for detecting a frame or a field which has the extracted large area as the close-up shot if it is judged that it meets the predetermined condition.

According to this aspect, in the close-up shot specifying device, first, by an evaluating device which is composed of such as a processor and a memory, a plurality of evaluated values corresponding to each of a plurality of evaluation items are given to the extracted large area. The evaluation item is, for example, width ratio (i.e. aspect ratio) between a horizontal width and a longitudinal width of a rectangle which is circumscribed the large area or the like if the evaluation item concerns the shape of large areas. Alternatively, the evaluation item is the coordinates of the barycentric position of the large area on a frame, or the coordinates of one or a plurality of apexes of a rectangle which is circumscribed the large area if the evaluation item concerns positions on a frame. Next, by the judging device which is composed of such as a processor and a memory, it is judged whether or not at least one of the given evaluation values meets the predetermined condition corresponding to the evaluation values. Then, if it is judged that it meets the predetermined condition, by the close-up shot detecting device which is composed of such as a processor and a memory, a frame or a field which has the extracted large area is detected as the close-up shot. Thus, it is possible to specify the close-up shot exceedingly effectively on the basis of the specified large area.

In another aspect of the close-up shot detecting apparatus of the present invention, the plurality of evaluation items includes area ratio between area of the specified large area and area of a rectangle which is circumscribed the extracted large area, and the predetermined condition is that the area ratio is greater than or equal to an area ratio threshold.

According to this aspect, the plurality of evaluation items includes area ratio between area of the extracted large area and area of a rectangle which is circumscribed the extracted large area. In this case, the evaluating device, for example, gives the area ratio as the evaluated value.

The "area ratio threshold" is a value which determines whether or not a frame is the close-up shot. The area ratio threshold is typically set as a fixed value in advance, but the area ratio threshold may be set as a changeable value changing according to some parameter. This area ratio threshold is set as a value which can certainly estimate that a frame is the close-up shot. Incidentally, the "area ratio" and the "area ratio threshold" may be expressed in not only ratio but also percentage or fraction.

In another aspect of the close-up shot detecting apparatus of the present invention, the plurality of evaluation items includes width ratio between a horizontal width and a longitudinal width of a rectangle which is circumscribed the specified large area, and the predetermined condition is that the width ratio is within a predetermined range.

According to this aspect, the plurality of evaluation items includes width ratio (i.e. aspect ratio) between a horizontal width and a longitudinal width of a rectangle which is circumscribed the specified large area. In this case, the evaluating device, for example, gives the width ratio as the evaluated value. Incidentally, the "width ratio" may be expressed in not only ratio but also percentage or fraction.

The "predetermined range" is a range which determines whether or not a frame is the close-up shot. The predetermined range is typically set as a fixed value in advance, but the predetermined range may be set as a changeable value changing according to some parameter. This predetermined range is, for example, $0.7 \leq$ a horizontal width/a longitudinal width$\leq 1.2$. The predetermined range is sat as a range which can certainly estimate that a frame is the close-up shot.

In another aspect of the close-up shot detecting apparatus of the present invention, the plurality of evaluation items includes a barycentric position of the specified large area, and the predetermined condition is that the barycentric position is below a predetermined position to a longitudinal width of the frame or the field.

According to this aspect, the plurality of evaluation items includes a barycentric position of the specified large area. In this case, the evaluating device, for example, gives the barycentric position as the evaluated value. Incidentally, the "barycentric position" is typically expressed in a coordinate value in a frame. The "coordinate value" may be an absolute value, or ratio, fraction or percentage of a horizontal width or a longitudinal width of a frame, for example.

The "predetermined position" is a position (e.g. the coordinate value) which determines whether or not a frame is the close-up shot. The predetermined position is typically set as a fixed value in advance, but the predetermined position may be set as a changeable value changing according to some parameter. This predetermined position is set as a position which can certainly estimate that a frame is the close-up shot.

Incidentally, "below a predetermined position to a longitudinal width of the frame" means that the barycentric position exists below the predetermined position in Y axis direction of a frame. Specifically, for example, when the coordinate of upper left of a frame is X=0, Y=0, it means that the value of Y-coordinate of the barycentric position is greater than the value of Y-coordinate of the predetermined position.

In another aspect of the close-up shot detecting apparatus of the present invention, said motion detecting device calculates the amount of motion by performing frequency analysis on each of the predetermined units.

According to this aspect, the motion detecting device performs the frequency analysis on image signal in each of predetermined units of a frame for a motion calculating processing which is generated from at least two frames or fields of which sampling time is different from each other. Then, the motion detecting device obtains the amount of motion by obtaining power ratio between vertical maximum frequency component of the predetermined unit and whole of the predetermined unit on the basis of the result of the performed frequency analysis.

In this aspect, the frequency analysis may include two-dimensional discrete cosine transform or discrete Fourier transform.

By virtue of such construction, it is possible to effectively calculate the amount of motion, so it is possible to further shorten the time for a process.

In the aspect which is provided with the aforementioned connected area detecting device, said connected area detecting device may detect the connected areas by performing a labeling processing on each of the predetermined units on the frame or the field.

By virtue of such construction, it is possible to detect connected areas relatively easily by using the labeling processing.

In the aspect which is provided with the aforementioned close-up shot detecting device, the close-up shot detecting apparatus is further provided with: a position range detecting device for detecting position range of the specified large area, and said close-up shot detecting device may detect a frame which has the specified large area as the close-up shot if the detected position range is arrayed a center of the frame when it is judged that it meets the predetermined condition.

By virtue of such construction, the position range detecting device, which is composed of such as a processor and a memory, detects the position range of the specified large area. The position range is expressed in the barycentric position of the large area and the coordinate of each of apexes of a rectangle which is circumscribed the large area, for example. Incidentally, the "center" means that all of apexes of a rectangle which is circumscribed the large area are not on the edge of a frame or a field.

By this, it is possible to prevent detecting a frame or a field where a masking object is filmed in close-up by an object which is not a target object (hereinafter as also called "masking object") passing in front of a target object as the close-up shot, so it is extremely useful in practice.

In the aspect which is provided with the aforementioned close-up shot detecting device, the close-up shot detecting apparatus is further provided with: a counting device for counting number of areas of the detected areas, and said close-up shot detecting device detecting a frame which has the specified large area as the close-up shot if the counted number of areas is less than or equal to a threshold for number of areas when it is judged that it meets the predetermined condition.

By virtue of such construction, the counting device, which is composed of such as a processor and a memory, counts the number of areas of the detected areas. According to the study of the present inventor, for example, it is turned out that in a frame or a field which is obtained when there is a camera work such as zoom or PAN, a large number of areas area detected. Therefore, it is possible to judge whether or not there is a camera work by counting detected areas.

Incidentally, the "threshold for number of areas" is a value which determines whether or not there is a camera work. The threshold for number of areas is typically set as a fixed value in advance, but the threshold for number of areas may be set as a changeable value changing according to some parameter. This threshold for number of areas depends on the resolution of an image and the predetermined unit. This threshold for number of areas is, for example, 10 blocks if the resolution of an image is 480 pixels long by 720 pixels width and if the predetermined unit is 16 pixels long by 16 pixels width. The threshold for number of areas is set as a value which can certainly estimate that there is a camera work.

In another aspect of the close-up shot detecting apparatus of the present invention, the close-up shot detecting apparatus is further provided with: a face detecting device for performing face detection on the frame of the field.

In this aspect, even when a target object which is filmed in close-up remains stationary i.e. even when it is not detected by the series of process caused by the motion detecting device, the binarizing device, the connected area detecting device and the large area specifying device, it is possible to detect it as the close-up shot if area of a face area which is detected by the face detecting device, which is composed of such as a processor and a memory, is greater than or equal to a predetermined area.

The above object of the present invention can be achieved by an electronic apparatus is provided with: the aforementioned close-up shot detecting apparatus (including its various aspects); and a processing device for performing at least one of receiving, transmitting, reproducing, filming, recording and editing on the image.

According to the electronic apparatus of the present invention, since it is composed of the aforementioned close-up shot detecting apparatus of the present invention, it is possible to easily and swiftly detect the close-up shot. As a result, it is possible to realize various electronic apparatuses which adapt to viewing chapters in thumbnailed form or digest reproducing such as a video camera which has an edit function and an assist function for filming, a motion picture reproducing apparatus, a video editing apparatus, a video server and a video storage apparatus. Especially, it is also possible to perform various processings on the basis of the close-up shot which is specified by the close-up shot detecting apparatus.

The above object of the present invention can be achieved by a close-up shot detecting method is provided with: a motion detecting process of calculating amount of motion between at least two frames or fields constituting an image for every predetermined units each of which is composed of one pixel or a plurality of adjacent pixels constituting the frames or the fields; a binarizing process of converting the calculated amount of motion into binary; a large area specifying process of specifying an area where number of the predetermined units is greater than or equal to a predetermined threshold as a large area from connected areas where the predetermined units of which the binarized amount of motion is identical are connected; and a close-up shot specifying process of specifying a frame or a field which has the specified large area as a close-up shot if at least one of a plurality of evaluation items preliminarily determined in regard to the specified large area meets a predetermined condition.

According to the close-up shot detecting method of the present invention, it is possible to easily and swiftly identify the close-up shot in a similar way to the close-up shot detecting apparatus of the present invention as described above.

Incidentally, in the close-up shot detecting method of the present invention, it is possible to adopt various aspects which are similar to various aspects of the close-up shot detecting apparatus of the present invention as described above.

The above object of the present invention can be achieved by a computer program making a computer function as the close-up shot detecting apparatus of the present invention as described above (including its various aspects).

According to the computer program of the present invention, it is possible to relatively easily realize the aforementioned close-up shot detecting apparatus of the present invention, by loading the computer program from a recording medium for storing the computer program, such as a CD-ROM (Compact Disc Read Only Memory), a DVD-ROM (Digital Versatile Disc Read Only Memory) or the like, into the computer of a shot size identifying apparatus, or by downloading the computer program through a communication device. Thus, it is possible to easily and swiftly detect the close-up shot in a similar way to the aforementioned close-up shot detecting apparatus of the present invention.

The operation and other advantages of the present invention will become more apparent from Best Mode for Carrying Out the Invention described below.

As explained above in detail, since it is provided with the motion detecting device, the binarizing device, the large area specifying device and the close-up shot specifying device according to the close-up shot detecting apparatus of the present invention; since it is provided with the motion detecting process, the binarizing process, the large area specifying process and the close-up shot specifying process according to the close-up shot detecting method of the present invention; since a computer is made function as the aforementioned close-up shot detecting apparatus according to the computer program of the present invention, it is possible to easily and swiftly detect the close-up shot.

Figure 1:
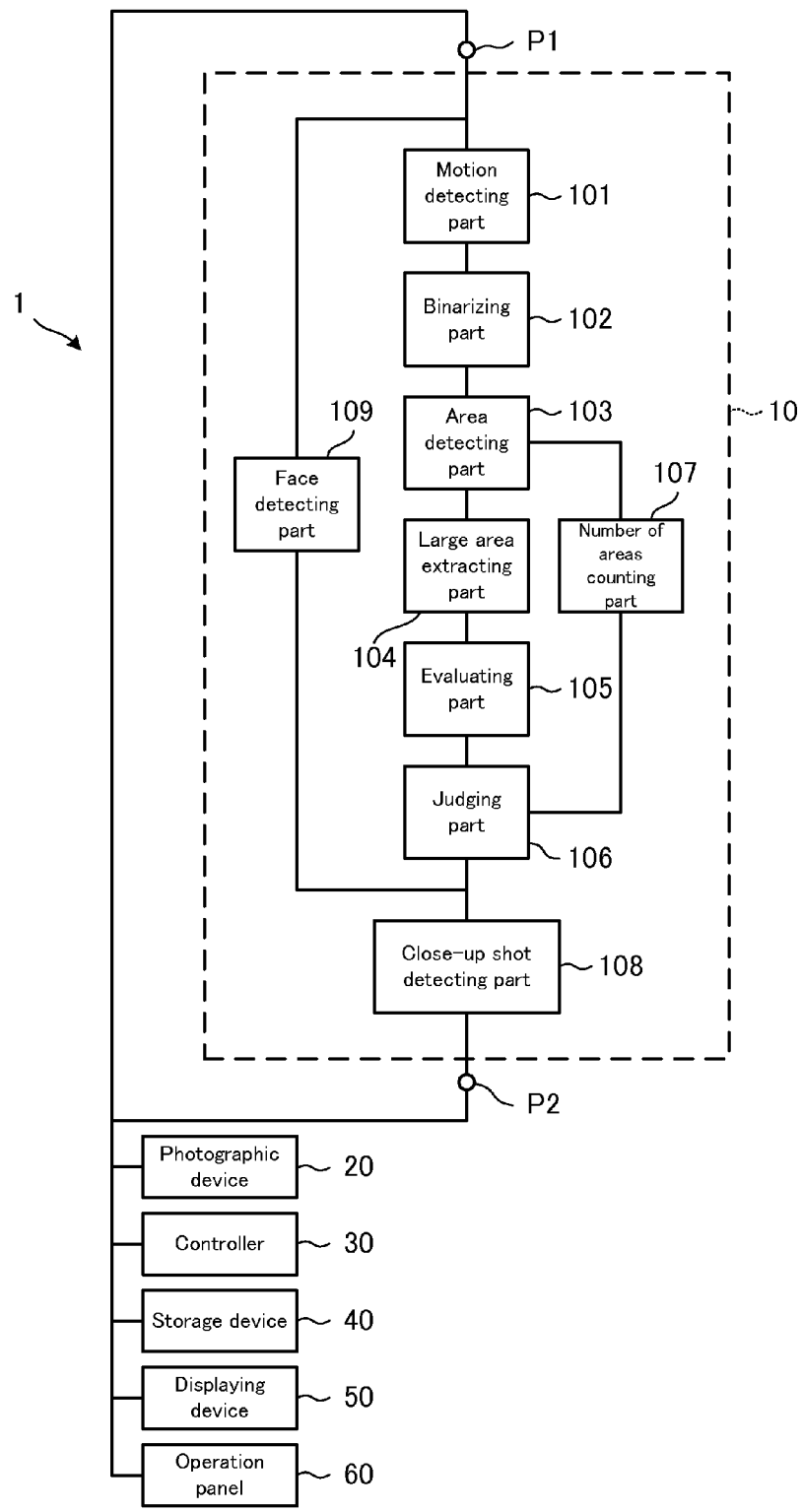
FIG. 1 is a block diagram showing the structure of a video camera of first embodiment.

DESCRIPTION OF REFERENCE CODES 1 video camera
10 close-up shot detecting apparatus
20 photographic device
30 controller
40 storage device
50 displaying device
60 operation panel
Best Mode for Carrying out the Invention Hereinafter, embodiments of a video camera which is one example of an electronic apparatus provided with the close-up shot detecting apparatus of the present invention will be explained on the basis of figures.

<First Embodiment>

First embodiment of a video camera which is provided with the close-up shot detecting apparatus of the present invention will be described with reference to FIG. 1 to FIG. 5.

First, with reference to FIG. 1, the explanation will be given on the structure of a video camera of the embodiment. FIG. 1 is a block diagram showing the structure of the video camera of the embodiment.

In FIG. 1, the video camera 1 is provided with a close-up shot detecting apparatus 10, a photographic device 20, a controller 30, a storage device 40, a displaying device 50 and an operation panel 60.

The close-up shot detecting apparatus 10 is provided with a motion detecting part 101, a binarizing part 102, an area detecting part 103, a large area extracting part 104, an evaluating part 105, a judging part 106, a number of areas counting part 107, a close-up shot detecting part 108 and a face detecting part 109.

Here, the "motion detecting part 101", the "binarizing part 102", the "number of areas counting part 107" and the "face detecting part 109" of the embodiment are one example of the "motion detecting device", the "binarizing device", the "counting device" and the "face detecting device" of the present invention, respectively. The "area detecting part 103" and the "large area extracting part 104" of the embodiment are one example of the "connected area detecting device" and the "large area detecting device" of the present invention, respectively. By both of these, one example of the "large area specifying device" is constituted. The "evaluating part 105", the "judging part 106" and the "close-up shot detecting part 108" of the embodiment are one example of the "evaluating device", the "judging device" and the "close-up shot detecting device" of the present invention, respectively. By these three, one example of the "close-up shot specifying device" is constituted.

The photographic device 20 is composed of, for example, a lens and a CCD (Charge Coupled Device). The photographic device 20 is constructed to film motion pictures or sequential photographs, and to generate frame imageries which arrayed on a time axis at predetermined intervals or regular intervals and which is one example of the "frame" of the present invention. The storage device 40 is a HDD (Hard Disk Drive) or a nonvolatile memory for example. The storage device 40 successively stores the motion pictures or the like which are generated by the photographic device 20.

The controller 30 controls the photographic device 20 in accordance with a command from a user accepted via the operation panel 60, or displays the motion pictures or the like which are filmed by the photographic device 20 on the displaying device 50, which is for example a LCD (Liquid Crystal Display) or the like. Alternatively, the controller 30 controls the close-up shot detecting apparatus 10 to detect close-up shot of the filmed motion pictures or the like.

At the time when a request for close-up shot detecting is accepted by the operation panel 60, the controller 30 controls the close-up shot detecting apparatus 10 to read motion pictures (or sequential photographs) stored in the storage device 40.

Figure 2:
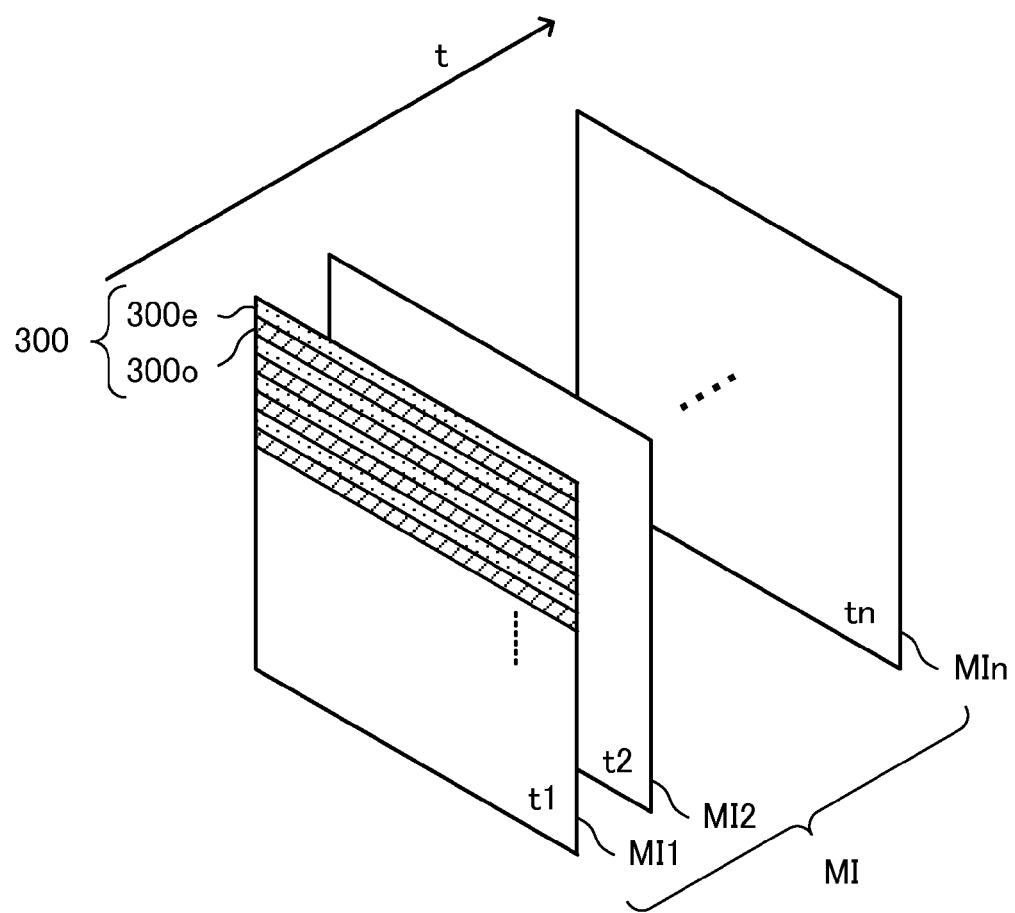
FIG. 2 is a conceptual view showing schematically a plurality of frame imageries arrayed on a time axis in the first embodiment.

Here, with reference to FIG. 2, the additional explanation will given on the frame imagery. FIG. 2 is a conceptual view showing schematically a plurality of frame imageries arrayed on a time axis in the first embodiment.

In FIG. 2, the motion picture MI (or sequential photographs) is composed of the plurality of frame imageries MI1, MI2, . . . , MIn that are obtained at each time t1, t2, . . . , tn on the time axis t. Here, focus attention on the frame imagery MI1, the frame imagery MI1 is composed of the plurality of lines 300. Each of the plurality of lines 300 is numbered beginning at the top such as 0, 1, 2, . . . . In FIG. 2, 300e and 300o indicate even lines and odd lines, respectively.

Return to FIG. 1 again, the motion detecting part 101 calculates amount of motion between at least two frame imageries or field imageries of a motion picture, which is read via an input terminal P1 of the close-up shot detecting apparatus 10, by block unit, which is one example of the "predetermined unit" of the present invention.

Specifically, first, if the read motion picture (i.e. input video signal) is interlaced, a frame imagery for an amount of motion calculating processing is generated by combining an odd field which is composed of odd lines 300o of the frame imagery MI1 and an even field which is composed of even lines 300e.

Alternatively, if the read motion picture is progressive, a frame imagery for the amount of motion calculating processing is generated by combining an odd field of the frame imagery MI1 and an even field of the frame imagery MI2. Incidentally, the combination of the odd field and the even field may be opposite. The combined frame imageries are not limited to frame imageries arrayed sequentially; frame imageries that are separated from each other by a few frames may be combined. In this case, if time difference between combined frame imageries is large, it is possible to detect an object which moves slow in the frame imageries. However, if the travel distance of the object between combined frame imageries exceeds the size of the block, it is impossible to detect the object. Thus, it is preferable that combined frame imageries are within a few frames.

A frame imagery for the amount of motion calculating processing may be generated by combining an odd field of one of two frame imageries that are arrayed sequentially and an even field of the other of two frame imageries regardless of interlaced frame imageries or progressive frame imageries. Or the frame imagery for the amount of motion calculating processing may be generated by combining an odd field and an odd field, or an even field and an even field. Incidentally, the "odd field" and the "even field" of the embodiment is one example of the "field" of the present invention.

Next, the motion detecting part 101 performs frequency analysis such as two-dimensional discrete cosine transform or discrete Fourier transform on video signal indicating a brightness value, a color density value or the like in each of blocks of the generated frame imagery for amount of motion calculating processing. Then, amount of motion is obtained by obtaining power ratio between vertical maximum frequency component of the block and whole of the block on the basis of the result of the performed frequency analysis.

Figure 3:
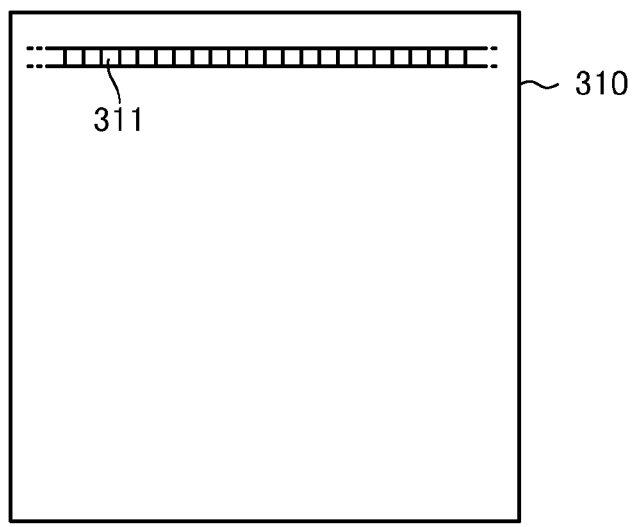
FIG. 3 is a conceptual view showing schematically one example of a block in a frame imagery for a motion calculating processing of the first embodiment.
Figure 3:
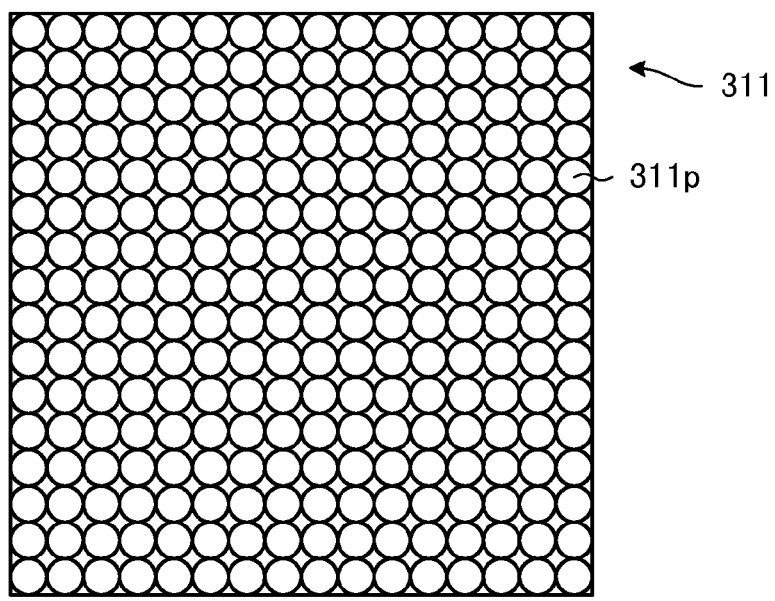

Here, with reference to FIG. 3, the additional explanation will given on the block. FIG. 3 is a conceptual view showing schematically one example of the block in frame imageries of the embodiment.

In FIG. 3(a), the frame imagery 310 for the amount of motion calculating processing is divided into a plurality of blocks 311. As shown in FIG. 3(b), the block 311 is composed of a predetermined number of pixels 311p (here, 16 pixels long by 16 pixels width) which consist the frame imagery 310.

When the two-dimensional discrete cosine transform is used as the frequency analysis, the motion detecting part 101 calculates amount of motion for detecting blocks where there is motion (i.e. blocks where an object of which position is changed between at least two frame imageries or field imageries is filmed) in accordance with a coefficient of two-dimensional discrete cosine transform. Specifically, for example, amount of motion is calculated by the following formula (1) using the coefficient of two-dimensional discrete cosine transform $X_{u,v}$ in a transformed space coordinates which is composed of space frequency of a horizontal direction u and space frequency of a vertical direction v that are transformed from a block where the number of pixels of a horizontal direction is m and the number of pixels of a vertical direction is n.

$$\frac{X_{0,N-1}^2}{\sum_u \sum_v X_{u,v}^2} \quad (1)$$

Return to FIG. 1 again, the binarizing part 102 converts the calculated amount of motion into binary. The area detecting part 103 extracts blocks which have one value of binarized amount of motion, and then detects connected areas where the extracted blocks are connected. Specifically, the area detecting part 103 detects areas by performing a labeling processing on the binarized frame imagery 310.

Next, the large area extracting part 104 extracts an area where the number of blocks included in the detected connected flat area is greater than or equal to a threshold for number of blocks (e.g. 60 blocks), which is one example of the "threshold for number of units" of the present invention, as large areas.

Next, the evaluating part 105 gives a plurality of evaluation values corresponding to each of a plurality of evaluation items for the extracted large area.

Figure 4:
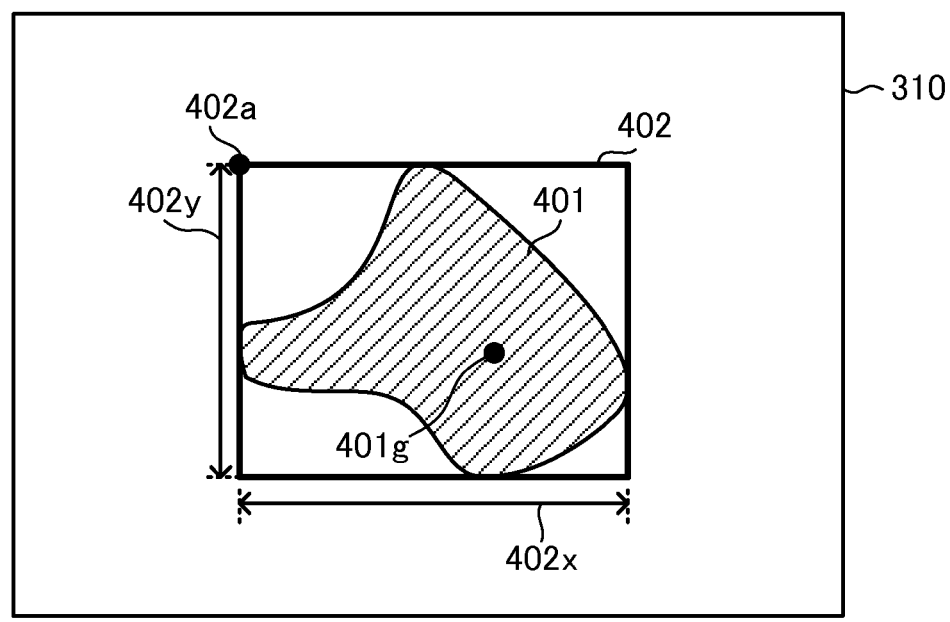
FIG. 4 is a conceptual view showing one example of an evaluation item for large areas of the first embodiment.

Here, with reference to FIG. 4, the additional explanation will be given on the plurality of evaluation items. FIG. 4 is a conceptual view showing one example of an evaluation item for large areas of the embodiment.

The evaluating part 105 gives evaluation values corresponding to area ratio between area of the large area 401 and area of the circumscribed rectangle 402 circumscribed the large area 401, width ratio (hereinafter as also called "aspect ratio") between the horizontal width 402$x$ and the longitudinal width 402$y$ of the circumscribed rectangle 402, the barycentric position of the barycenter 401$g$ of the large area 401, and the like for the large area 401 on the frame imagery 310.

Return to FIG. 1 again, the number of areas counting part 107 counts the number of areas detected by the area detecting part 103.

The judging part 106 judges whether or not at least one of the plurality of evaluation items, which are given for the large area 401, meets a predetermined condition corresponding to the evaluation item. Here, the predetermined condition is that the area ratio is greater than or equal to an area ratio threshold (e.g. 0.5) if the evaluation value is area ratio; the aspect ratio is within a predetermined range (e.g. 0.7≦the horizontal width 402$x$/the longitudinal width 402$y$≦1.2) if the evaluation value is the aspect ratio; the barycentric position exists below a predetermined position in the longitudinal width of the frame imagery MI1 (e.g. the barycenter 401$g$ extents in lower two thirds of the frame imagery 310) if the evaluation value is the barycentric position of the barycenter 401$g$.

The judging part 106 further judges whether or not the number of areas, which is counted by the number of areas counting part 107, is less than or equal to a threshold for number of areas (e.g. 10).

If it is judged that at least one evaluation item meets the predetermined condition, and if it is judged that the counted number of areas is less than or equal to the threshold for number of areas, the close-up shot detecting part 108 detects an even field or an odd field, or a frame imagery including the even field or the odd field that constitutes the frame imagery 310 which has the large area 401 as the close-up shot. Then, the close-up shot detecting part 108 outputs a result via an output terminal P2. The outputted result is displayed on the displaying device 50 by the controller 30, or is stored in the storage device 40. By the aforementioned series of processings, it is possible to detect the close-up shot of a moving object.

On the other hand, the face detecting part 109 performs a predetermined face detecting processing on the plurality of frame imageries MI1, MI2, . . . , MIn constituting the read motion picture MI, or even fields or odd fields constituting a frame imagery. Specifically, for example, the face detecting part 109 detects a face as follows: a flesh colored area on the frame imagery MI1 is detected; it is judged whether or not area, the shape, the position and the like of the flesh colored area meet conditions corresponding to each of them; the flesh colored area is detected as a face if it is judged that the flesh colored area meets predetermined conditions.

The close-up shot detecting part 108 detects the frame imagery where a face is detected as the close-up shot, then outputs a result. Thus, it is possible to detect the close-up shot even when a target object remains stationary.

As a result, according to the embodiment, it is possible to easily and swiftly detect the close-up shot. Therefore, it is possible to provide the video camera 1 which adapts to viewing chapters in thumbnailed form or digest reproducing.

Incidentally, in addition to the electronic apparatus explained with reference to FIG. 1, a motion picture reproducing apparatus, a video editing apparatus, a video server, a video storage apparatus and the like are pointed to as an example of the electronic apparatus. It is obvious that the present invention can be applied to these various electronic apparatuses.

Figure 5:
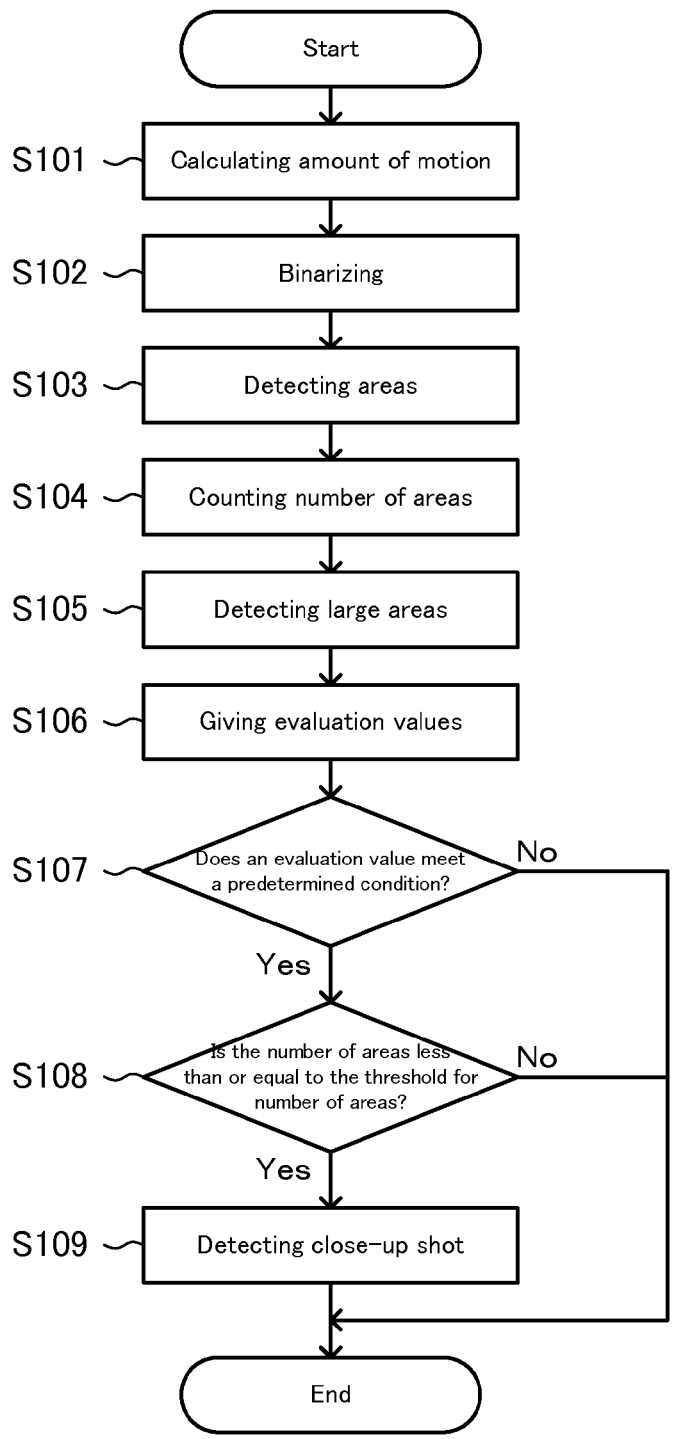
FIG. 5 is a flowchart showing a moving object close-up shot detecting processing in a close-up shot detecting apparatus of the first embodiment.
Figure 6:
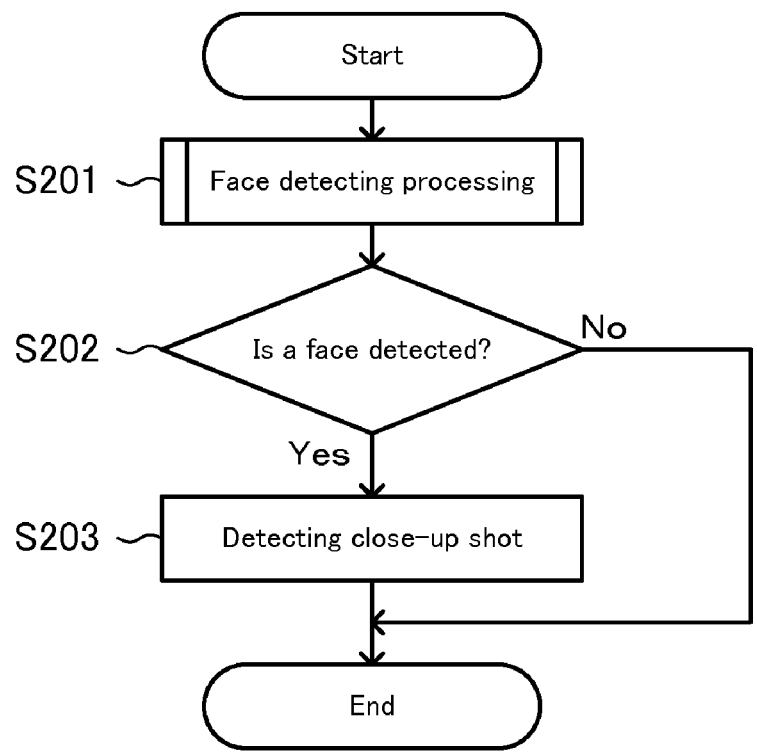
FIG. 6 is a flowchart showing a face detecting processing in the close-up shot detecting apparatus of the first embodiment.

Next, the additional explanation will be given on the operation of the close-up shot detecting apparatus 10, which is installed in the video camera 1 constructed in the above manner with reference to FIG. 5 and FIG. 6. FIG. 5 is a flowchart showing a moving object close-up shot detecting processing in a close-up shot detecting apparatus of the first embodiment. FIG. 6 is a flowchart showing a face detecting processing in the close-up shot detecting apparatus of the first embodiment.

Incidentally, an operation indicated as follows is performed by every parts constituting the close-up shot detecting apparatus 10 (cf. FIG. 1) arbitrarily performing a computer program which is loaded, downloaded or the like to the storage device 40 or other storage device which is attached to the external of the close-up shot detecting apparatus 10 or is mounted on the close-up shot detecting apparatus 10.

In FIG. 5, first, by the motion detecting part 101, amount of motion between at least two frame imageries or field imageries of the read motion picture MI is calculated in the block 311 (step S101).

Then, by the binarizing part 102, the calculated amount of motion is converted into binary (step S102). Next, by the area detecting part 103, blocks which have one value of binarized amount of motion are extracted, and then, areas where the extracted blocks are connected are detected (step S103).

Next, by the number of areas counting part 107, the number of areas of the detected area is counted (step S104). By the large area extracting part 104, an area where the number of blocks included in a detected area is greater than or equal to the threshold for number of blocks is extracted as a large area almost as soon as the counting the number of areas (step S105).

Next, by the evaluating part 105, a plurality of evaluation values corresponding to each of a plurality of evaluation items are given for an extracted large area (step S106). Then, by the judging part 106, it is judged whether or not a given evaluation value meets a predetermined condition (step S107). If it is judged that the given evaluation value does not meet the predetermined condition (the step S107: No), the processing is once stopped and the processing from the step S101 is performed on another frame imagery or field imagery.

If it is judged that the given evaluation value meets the predetermined condition (the step S107: Yes), then, by the judging part 106, it is judged whether or not the counted number of areas is less than or equal to the threshold for number of areas (step S108). If it is judged that it is greater than the threshold for number of areas (the step S108: No), the processing is once stopped and the processing from the step S101 is performed on another frame imagery or field imagery.

If it is judged that it is less than or equal to the threshold for number of flat areas (the step S108: Yes), by the close-up shot detecting part 108, the fulfilled frame imagery or field imagery is detected as the close-up shot. Then, the result is outputted (step S109) and the processing from the step S101 is performed on another frame imagery or field imagery. Incidentally, each of processings of step S107 and S108 may be performed in tandem.

In FIG. 6, by the face detecting part 109, the predetermined face detecting processing is performed on the frame imagery or the field imagery constituting the read motion picture MI (step S201). Next, it is judged whether or not a face is detected (step S202). If it is judged that a face is not detected (the step S202: No), the processing is once stopped and the processing from the step S201 is performed on another frame imagery or field imagery.

If it is judged that a face is detected (the step S202: Yes), by the close-up shot detecting part 108, the fulfilled frame imagery or field imagery is detected as the close-up shot. Then, the result is outputted (step S203) and the processing from the step S201 is performed on another frame imagery or field imagery.

<Second Embodiment>

Figure 7:
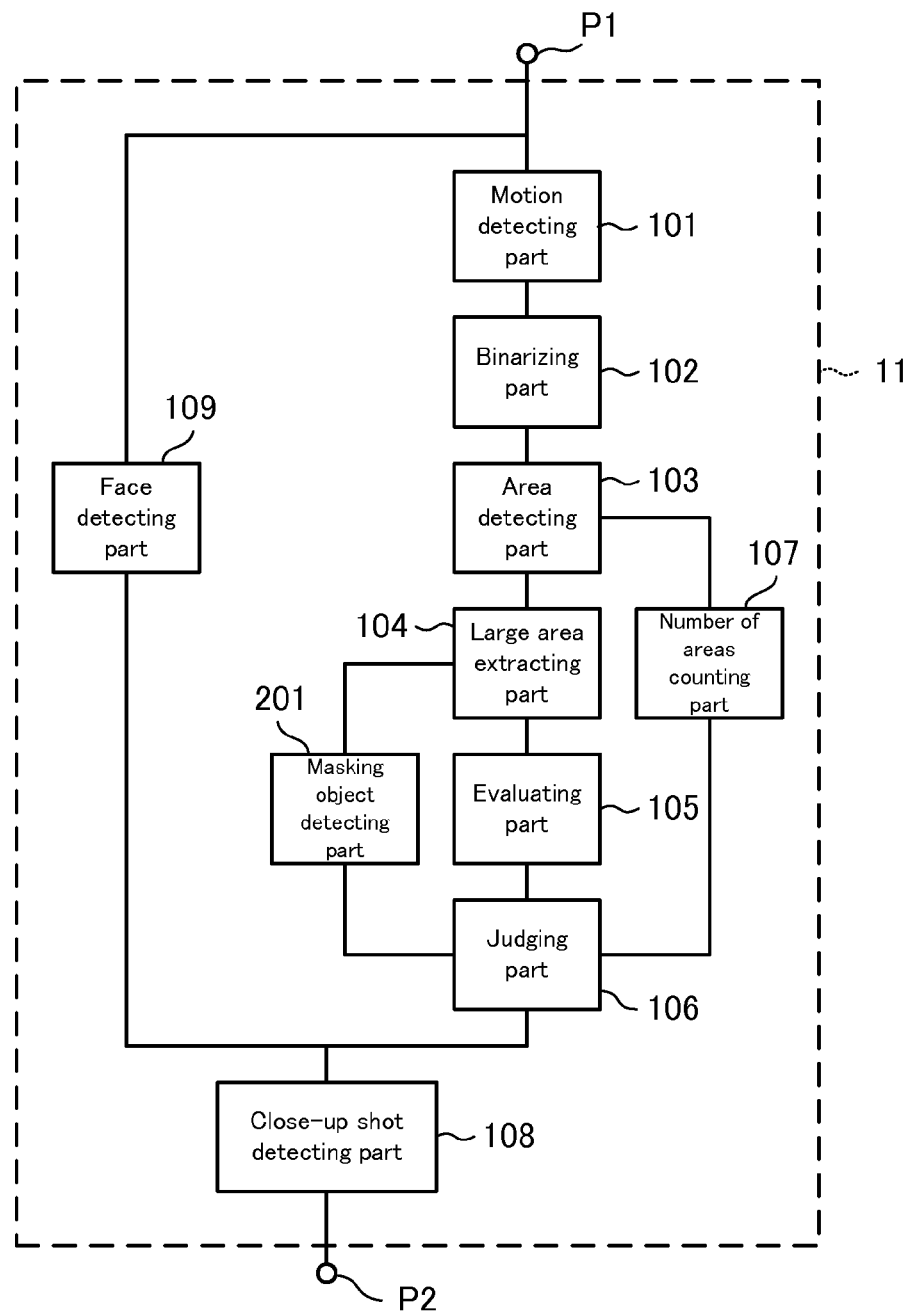
FIG. 7 is block diagram showing the structure of a close-up shot detecting apparatus of second embodiment.
Figure 8:
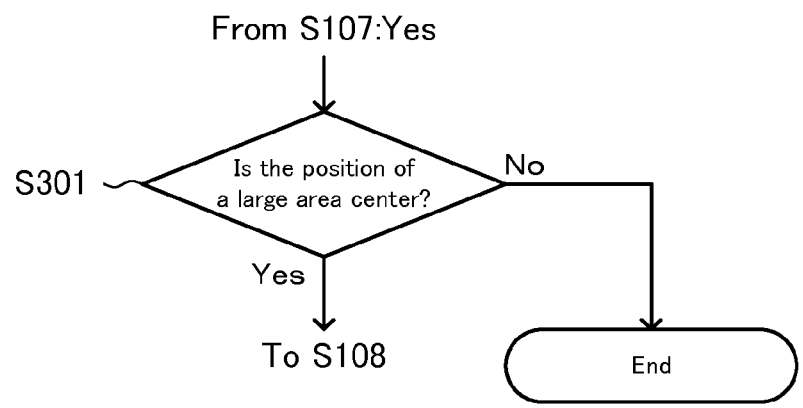
FIG. 8 is a flowchart showing a moving object close-up shot detecting processing in the close-up shot detecting apparatus of the second embodiment.

Second embodiment of a video camera which is provided with the close-up shot detecting apparatus of the present invention will be described with reference to FIG. 7 and FIG. 8. In the second embodiment, the second embodiment is similar to the structure of the first embodiment except for the point that the structure of the close-up shot detecting apparatus is different from each other. Thus, the explanation overlapping the first embodiment will be omitted, and the same components on figures carry the same numerical references. Basically, only different points will be described with reference to FIG. 7 and FIG. 8. FIG. 7 is block diagram showing the structure of a close-up shot detecting apparatus of second embodiment.

In FIG. 7, the close-up shot detecting apparatus 11 is provided with a motion detecting part 101, a binarizing part 102, an area detecting part 103, a large area extracting part 104, an evaluating part 105, a judging part 106, a number of areas counting part 107, a close-up shot detecting part 108, a face detecting part 109 and a masking object detecting part 201. Here, the "masking object detecting part 201" of the embodiment is one example of the "position range detecting device" of the present invention.

The masking object detecting part 201 detects a position range indicating where the large area 401, which is extracted by the large area extracting part 104, as shown in FIG. 4 in the first embodiment covers on the frame imagery 310. This position range is indicated by the coordinate of the upper left 402a, the horizontal width 402x and the longitude width 402y of the circumscribed rectangle 402, for example.

The close-up shot detecting part 108 detects it as the close-up shot on the condition of it meeting other condition if it is judged that the detected position range lies a center of the frame imagery 310.

By this, it is possible to prevent detecting a frame imagery or a field imagery where a masking object is filmed in close-up caused by the masking object passing in front of a target object as the close-up shot.

Next, the explanation will be given on the operation of the close-up shot detecting apparatus 11 of the embodiment with reference to a flowchart of FIG. 8. In the embodiment, the embodiment is similar to the first embodiment except for a processing is added between the step S107 and the step S108 in the motion object close-up shot detecting processing of the first embodiment. Thus, the explanation overlapping the first embodiment will be omitted.

If it is judged that the given evaluation value meets the predetermined condition by the judging part 106 (the step S107: Yes), then, by the judging part 106, it is judged whether or not the detected position range lies the center of the frame imagery 310 (step S301). Incidentally, the "center of a imagery" may mean it does not overlap an edge of the imagery, or may mean a rectangular area or a circular area which is set around the center of the imagery and which has fixed or changeable size.

If it is judged that it lies (the step S301: Yes), then, the processing of the step S108 is performed. On the other hand, if it is judged that it does not lie (the step S301: No), the processing is once stopped and the processing from the step S101 is performed on another frame imagery or field imagery.

Incidentally, each of processings of steps S107, S108 and S301 may be performed in tandem.

Incidentally, the present invention is not limited to the aforementioned embodiment, but various changes may be made, if desired, without departing from the essence or spirit of the invention which can be read from the claims and the entire specification. A close-up shot detecting apparatus and method, an electronic apparatus and a computer program, all of which involve such changes, are also intended to be within the technical scope of the present invention.

The invention claimed is:

1. A close-up shot detecting apparatus, comprising:
a motion detecting device for calculating amount of motion between at least two frames or fields constituting an image for every predetermined units each of which is composed of one pixel or a plurality of adjacent pixels constituting the frames or the fields;
a binarizing device for converting the calculated amount of motion into binary;
a large area specifying device for specifying an area where number of the predetermined units is greater than or equal to a threshold for number of units as a large area from connected areas where the predetermined units of which the binarized amount of motion is identical are connected; and
a close-up shot specifying device for specifying a frame or a field which has the specified large area as a close-up shot if at least one of a plurality of evaluation items preliminarily determined in regard to the specified large area meets a predetermined condition.

2. The close-up shot detecting apparatus according to claim 1, said large area specifying device comprising:
a connected area detecting device for detecting the connected areas; and
a large area extracting device for extracting areas where the number of predetermined units is greater than or equal to the threshold for number of units as the large area.

3. The close-up shot detecting apparatus according to claim 1, said close-up shot specifying device comprising:
a judging device for judging whether or not the specified large area meets the predetermined condition corresponding to at least one of the plurality of evaluation items; and
a close-up shot detecting device for detecting a frame or a field which has the specified large area as the close-up shot if it is judged that it meets the predetermined condition.

4. The close-up shot detecting apparatus according to claim 1, wherein
the plurality of evaluation items includes area ratio between area of the specified large area and area of a rectangle which is circumscribed the specified large area, and
the predetermined condition is that the area ratio is greater than or equal to an area ratio threshold.

5. The close-up shot detecting apparatus according to claim 1, wherein
the plurality of evaluation items includes width ratio between a horizontal width and a longitudinal width of a rectangle which is circumscribed the specified large area, and
the predetermined condition is that the width ratio is within a predetermined range.

6. The close-up shot detecting apparatus according to claim 1, wherein
the plurality of evaluation items includes a barycentric position of the specified large area, and
the predetermined condition is that the barycentric position is below a predetermined position to a longitudinal width of the frame or the field.

7. The close-up shot detecting apparatus according to claim 1, wherein said motion detecting device calculates the amount of motion by performing frequency analysis on each of the predetermined units.

8. The close-up shot detecting apparatus according to claim 7, wherein the frequency analysis includes two-dimensional discrete cosine transform or discrete Fourier transform.

9. The close-up shot detecting apparatus according to claim 2, wherein said connected area detecting device detects the connected areas by performing a labeling processing on each of the predetermined units on the frame or the field.

10. The close-up shot detecting apparatus according to claim 3, further comprising:
a position range detecting device for detecting position range of the specified large area,
said close-up shot detecting device detecting a frame which has the specified large area as the close-up shot if the detected position range is arrayed a center of the frame when it is judged that it meets the predetermined condition.

11. The close-up shot detecting apparatus according to claim 3, wherein
said large area specifying device comprises a connected area detecting device for detecting the connected areas,
said close-up shot detecting apparatus further comprises a counting device for counting number of areas of the detected connected areas, and
said close-up shot detecting device detecting a frame which has the specified large area as the close-up shot if the counted number of areas is less than or equal to a threshold for number of areas when it is judged that it meets the predetermined condition.

12. The close-up shot detecting apparatus according to claim 1, further comprising:
a face detecting device for performing face detection on the frame of the field.

13. An electronic apparatus, comprising:
the close-up shot detecting apparatus according to claim 1; and
a processing device for performing at least one of receiving, transmitting, reproducing, filming, recording and editing on the image.

14. A close-up shot detecting method, comprising:
a motion detecting process of calculating amount of motion between at least two frames or fields constituting an image for every predetermined units each of which is composed of one pixel or a plurality of adjacent pixels constituting the frames or the fields;
a binarizing process of converting the calculated amount of motion into binary;
a large area specifying process of specifying an area where number of the predetermined units is greater than or equal to a threshold for number of units as a large area from connected areas where the predetermined units of which the binarized amount of motion is identical are connected; and
a close-up shot specifying process of specifying a frame or a field which has the specified large area as a close-up shot if at least one of a plurality of evaluation items preliminarily determined in regard to the specified large area meets a predetermined condition.

15. A non-transitory computer-readable medium containing a computer program for making a computer function as a close-up shot detecting apparatus comprising:
a motion detecting device for calculating amount of motion between at least two frames or fields constituting an image for every predetermined units each of which is composed of one pixel or a plurality of adjacent pixels constituting the frames or the fields;
a binarizing device for converting the calculated amount of motion into binary;
a large area specifying device for specifying an area where number of the predetermined units is greater than or equal to a threshold for number of units as a large area from connected areas where the predetermined units of which the binarized amount of motion is identical are connected; and
a close-up shot specifying device for specifying a frame or a field which has the specified large area as a close-up shot if at least one of a plurality of evaluation items preliminarily determined in regard to the specified large area meets a predetermined condition.

* * * * *